(12) United States Patent
Faber et al.

(10) Patent No.: US 6,461,090 B1
(45) Date of Patent: Oct. 8, 2002

(54) STOWABLE CARGO RESTRAINING BARRIER ASSEMBLY AND METHOD

(76) Inventors: Michael W. Faber, 833 Abbie St., Pleasanton, CA (US) 94566; Michael P. Podkomorka, 857 Abbie St., Pleasanton, CA (US) 94566

( * ) Notice: Subject to any disclaimer, the term of this patent is extended or adjusted under 35 U.S.C. 154(b) by 0 days.

(21) Appl. No.: 09/404,217

(22) Filed: Sep. 23, 1999

(51) Int. Cl.$^7$ .................................................. B60P 7/08
(52) U.S. Cl. ..................... 410/100; 410/117; 410/118; 410/97
(58) Field of Search ....................... 410/97, 100, 129, 410/117, 118; 296/24.1, 37.1, 37.5, 37.6, 37.8, 39.1, 39.2; 224/42.33, 42.34

(56) References Cited

U.S. PATENT DOCUMENTS

| | | | |
|---|---|---|---|
| 1,740,670 A | 12/1929 | Skaggs et al. | |
| 3,653,710 A | 4/1972 | Barnard | |
| 3,881,768 A | 5/1975 | Nix | |
| 4,222,695 A | 9/1980 | Sarides | 410/68 |
| 4,580,828 A | 4/1986 | Jones | |
| 4,629,390 A | 12/1986 | Burke | |
| 4,763,944 A | 8/1988 | Fry et al. | |
| 4,767,150 A | 8/1988 | Hall | |
| 4,875,730 A | 10/1989 | Justice | |
| 4,930,834 A | 6/1990 | Moore | |
| 4,997,227 A | 3/1991 | Falzone et al. | |
| 5,083,831 A | 1/1992 | Foyen | |
| 5,104,172 A | 4/1992 | Schildt | |
| 5,110,172 A | 5/1992 | Ney et al. | |
| 5,131,709 A | 7/1992 | Spica | |
| 5,167,479 A | * 12/1992 | Bott | 410/121 |
| 5,352,008 A | 10/1994 | Denvir | |
| 5,366,124 A | 11/1994 | Dearborn | |
| 5,395,682 A | 3/1995 | Holland et al. | |
| 5,456,514 A | 10/1995 | Justice | |
| 5,464,264 A | 11/1995 | Wilson | |
| 5,533,773 A | 7/1996 | Lessick | |
| 5,542,591 A | 8/1996 | Moore et al. | |
| 5,549,428 A | 8/1996 | Yeatts | 410/94 |
| 5,570,921 A | 11/1996 | Brooker | |
| 5,597,193 A | 1/1997 | Conner | |
| 5,599,055 A | 2/1997 | Brown | |
| 5,632,520 A | 5/1997 | Butz | |
| 5,655,863 A | 8/1997 | Mundt | 410/94 |
| 5,673,956 A | 10/1997 | Emery | |
| 5,722,710 A | 3/1998 | Falciani | |
| 5,743,589 A | 4/1998 | Felker | |
| 5,772,370 A | * 6/1998 | Moore | 410/100 |
| 5,788,309 A | 8/1998 | Emery et al. | |
| 5,788,310 A | 8/1998 | McKee | |
| 5,803,531 A | 9/1998 | Nielsen | |
| 5,806,909 A | 9/1998 | Wise | |
| 5,865,495 A | 2/1999 | Nguyen | |
| 5,961,263 A | * 10/1999 | Nunez | 410/117 X |
| 6,007,283 A | * 12/1999 | Labeur | 410/97 |
| 6,015,178 A | 1/2000 | Haack | |
| 6,017,075 A | 1/2000 | Emery et al. | |
| 6,053,554 A | 4/2000 | Doniaz | |
| 6,109,846 A | * 8/2000 | Davis et al. | 410/100 |

* cited by examiner

*Primary Examiner*—Stephen T. Gordon
(74) *Attorney, Agent, or Firm*—Dorsey & Whitney LLP (57) ABSTRACT

A stowable cargo restraining barrier assembly (10, 10") for restraining cargo (90) in a cargo space (25) of a transport vehicle (40). The assembly preferably includes a bed liner structure (20, 20', 20") that may be positioned on the bed of the cargo space (25) and at least one barrier device (60, 60', 60") that includes a barrier support structure, such as a rotatable axle or spindle (140) and barrier housing (100), in which a flexible barrier member (130, 130', 130") is stored in a rolled up condition. When not deployed to retain cargo, the barrier device (60, 60', 60") is storable in a barrier storage cavity (50, 50', 50") in the bed liner. During use, the barrier housing (100, 100') is pivoted up into the cargo space (25) and the barrier member (130, 130') is pulled to unroll a length thereof that may be used to wrap around or encircle a portion of a piece of cargo (90) in the cargo space (30). A transport vehicle (40) having the cargo restraining assembly (10, 10") and a method of restraining cargo in a transport vehicle also are disclosed.

5 Claims, 6 Drawing Sheets

STOWABLE CARGO RESTRAINING BARRIER ASSEMBLY AND METHOD

TECHNICAL FIELD

The present invention relates, in general, to assemblies and methods for restraining cargo movement in transport vehicles, and more particularly, relates to barrier, wall or partition assemblies which limit the movement of cargo in the cargo storage spaces of transport vehicles and the methods by which such barrier assemblies are mounted to and used in such transport vehicles.

BACKGROUND ART

On the order of one-half of the motor vehicles sold in the United States today are trucks or sport utility vehicles (SUVs). In addition, many of these vehicles, as well as many passenger cars, mini-vans and the like, are equipped to tow trailers. Thus, today's consumers generally regard the ability to transport cargo of various descriptions as a highly desired feature.

Trucks, SUVs and trailers all typically include a generally horizontally oriented cargo supporting surface or bed that is surrounded by generally vertically oriented side walls, which together define the cargo space of the transport vehicle. Usually one or more of the side walls is movable to provide better access to the cargo space, and most typically the aft wall or tailgate of the transport vehicle can be lowered to provide such access.

Cargo box bed liners also are in widespread use as a result of the proliferation of pickup trucks, mini-vans and sport utility vehicles. Such bed liners originally were intended to protect the cargo box of the transport vehicle from being damaged during loading and unloading of cargo. More recently, however, such bed liners have also included structures which enable cargo restraint.

The least complex of such cargo restraining bed liners merely provide non-skid surfaces, such as found in the bed liners of U.S. Pat. Nos. 5,570,921 and 5,803,531. Bed liners also may include tailgate padding panels which are supported by the original equipment tailgate, such may be found in U.S. Pat No. 5,722,710.

Restraint or limitation of the lateral movement of cargo within the four walls of a cargo space using cargo restraining bed liners also has been undertaken. Thus, bed liners which are grooved or pocketed and are used with cooperatively formed, plug-in type, cargo restraining members are well known. Typical of such system are the devices of U.S. Pat Nos. 5,131,709, 5,549,428, 5,599,055, 5,655,863, 5,673, 956, 5,788,309 and 5,788,310. This type of plug-in cargo restraint approach also has even been used on floor mats for automobiles. See, for example, U.S. Pat No. 4,222,695.

A common problem encountered with plug-in cargo restraining systems is the problem of what to do with the plug-in members when they are not in use. The existence of a multiplicity of unconnected components or parts creates tedious storage and handling problems.

The volume required for storage of such plug-in components also can be an issue since they preferably are carried by the transport vehicle when not in use. Moreover, since bed liners were originally developed to protect the cargo area of a vehicle from damage, the grooved or pocketed bed liners themselves can become damaged, with a resultant impairment of areas in the bed liner to which plug-in restraining components can be secured.

As used herein, the expression "transport vehicle" shall include motor vehicles, such as pickups, SUVs, vans, automobiles, buses, commercial trucks, watercraft, aircraft, trains, even golf carts, and equivalent motored vehicles used to transport cargo, as well as towed or unpowered cargo carriers, such as trailers and barges and equivalent unpowered vehicles used to transport cargo.

Accordingly, it is an object of the present invention to provide a cargo restraining barrier assembly and method for use in a transport vehicle, and a transport vehicle employing the same, in which a movable cargo restraining barrier is provided that can be easily stowed in the cargo space in a compact configuration.

It is a further object of the present invention to provide a stowable cargo restraining barrier assembly and method for a transport vehicle which can be readily installed as an after-market product.

Another object of the present invention is to provide a stowable cargo restraining barrier assembly which has fewer components and is easier to store and use than conventional transport vehicle cargo restraining systems, such as, bed liners with plug-in restraining components.

Still another object of the present invention is to provide a cargo restraining barrier assembly and method which will not impede cargo loading or unloading, can restrain cargo inwardly of the cargo space defining side walls, is durable and is relatively inexpensive to construct.

The stowable transport vehicle barrier assembly, vehicle and method of the present invention have other objects and features which will become apparent from, or are described in more detail in, the following description of the Best Mode of Carrying Out the Invention and the accompanying drawing.

DISCLOSURE OF THE INVENTION

The present invention provides a stowable, movable or retractable cargo restraining barrier assembly, a transport vehicle having such barrier assembly, and a method for its use.

The stowable barrier assembly most preferably is incorporated into a bed liner structure for a cargo space or cargo box of a transport vehicle. The barrier assembly includes a securement structure, such as the bed liner, formed for mounting of the cargo restraining barrier device to the vehicle proximate a cargo space of the transport vehicle, and a cargo restraining barrier device. The barrier device preferably takes the form of a movable barrier support structure, such as an axle or spindle, on which a flexible sheet-like barrier member is mounted in a rolled up condition. The axle preferably is mounted in a barrier housing which is movable by pivoting into and out of a barrier storage cavity in the bed liner. The barrier housing, therefore, swings up out of the bed liner storage cavity and into the cargo space before unrolling of the barrier member from the rotatably mounted axle. Associated with the axle is a spring biasing mechanism that applies tension to and retracts the flexible barrier member by rolling it up, window-shade fashion, around the axle. Mechanical couplers releasably couple the flexible barrier member in a deployed position. With the barrier member deployed and secured, movement of cargo in the cargo space may be limited.

In another embodiment a plurality of barrier devices are secured proximate the cargo space for deployment to positions limiting movement of cargo in the cargo space. The barrier devices again are most preferably flexible sheets which can be retracted into a bed liner. The plurality of barrier members can be coupled to cooperate with each other in their deployed positions to limit cargo movement.

If desired, the bed liner structure may be eliminated, and the barrier device mounted directly to the cargo bed of the transport vehicle by the securement structure. Moreover, in a further embodiment the axle is rotatable but not pivoted so that the flexible barrier member is simply unrolled directly from the bed liner storage cavity.

The method of the present invention comprises, briefly, the steps of mounting a barrier device to the transport vehicle proximate the cargo space, selectively moving the barrier device between a stowed position and a deployed position, and securing the barrier device in the deployed position limiting movement of cargo. Most preferably, the mounting step is accomplished by mounting a bed liner structure in the cargo space of the vehicle, with the bed liner carrying a flexible barrier member stowed in a rolled up condition. The moving step is most preferably accomplished by pivoting an axle carrying the flexible barrier member from a barrier storage cavity in the bed liner structure into the cargo space, and then, unrolling the flexible barrier member from the axle to a deployed position and securing it as deployed. Alternatively, the axle may be rotatably mounted directly to the bed liner and the flexible barrier member unrolled directly from the bed liner to enable securement around a piece of cargo.

BEST MODE OF CARRYING OUT THE INVENTION

The stowable cargo restraining barrier assembly of the present invention is particularly well suited for retrofitting applications in which a transport vehicle's cargo space is provided with a cargo restraining capacity merely by mounting a bed liner in the cargo space. The bed liner includes at least one selectively stowable and deployable barrier device which preferably, but not necessarily, takes the form of a flexible sheet-like barrier member that can be directly rolled out of the bed liner or is mounted to a support structure, such as an axle or spindle, and swings out of the bed liner and thereafter is unrolled.

FIGS. 1–4 illustrate a preferred embodiment of a stowable cargo restraining barrier assembly, generally designated 10, which is constructed in accordance with the present invention. In the embodiment shown, cargo restraining barrier assembly 10 is positioned on and in abutting relation to an upwardly facing near horizontal wall or bed 30 of an SUV or transport vehicle 40. Assembly 10 is comprised of a securement structure, here a bed liner 20, which is formed for mounting in cargo space 25 of vehicle 40, and a cargo restraining barrier device, generally designated 60.

While the preferred form of the invention is to employ a retrofittable bed liner structure 20 as the securement structure or mounting assembly for barrier device 60, it will be understood that in an original equipment embodiment (not shown) the securement structure for barrier device 60 also could take the form of a movable mount (for example, a pivotal mount) that merely attaches the barrier device to vehicle 40 proximate cargo space 25. For example, a pivotal mount (not shown) could be attached by fasteners or welding to bed 30 or to one or more of the side walls defining cargo space 25. Most preferably, such an embodiment would position the mounting or securement assembly in a storage cavity in bed 30 or the vehicle side walls. Thus, as used herein, the expression "vehicle body assembly" shall include a transport vehicle 40 alone or a vehicle 40 having a bed liner structure 20 mounted thereto.

Figure 1:
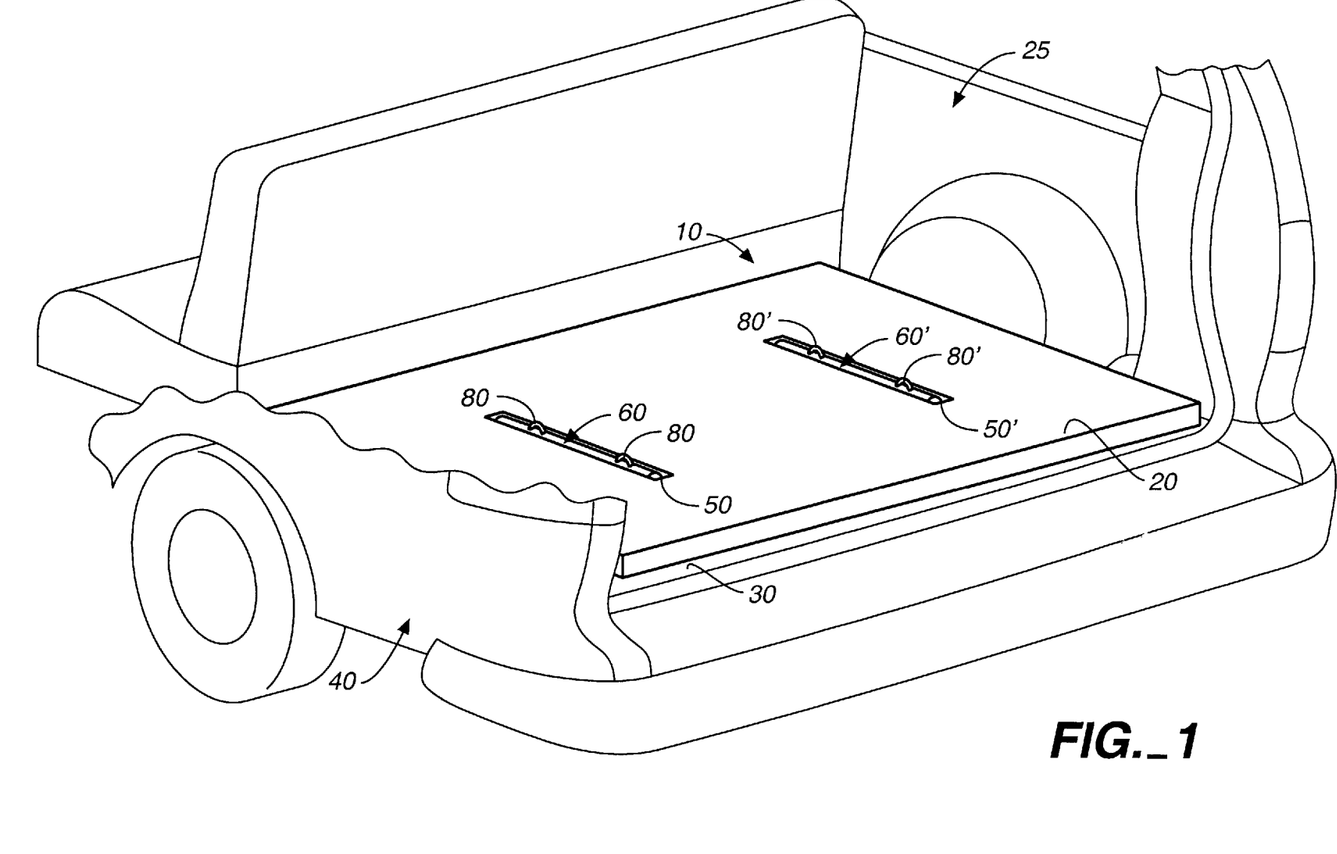
FIG. 1 is a fragmentary, top perspective view of a stowable cargo restraining barrier assembly constructed according to the present invention and mounted on the bed of a sports utility vehicle with two barrier devices in stowed positions.
Figure 3:
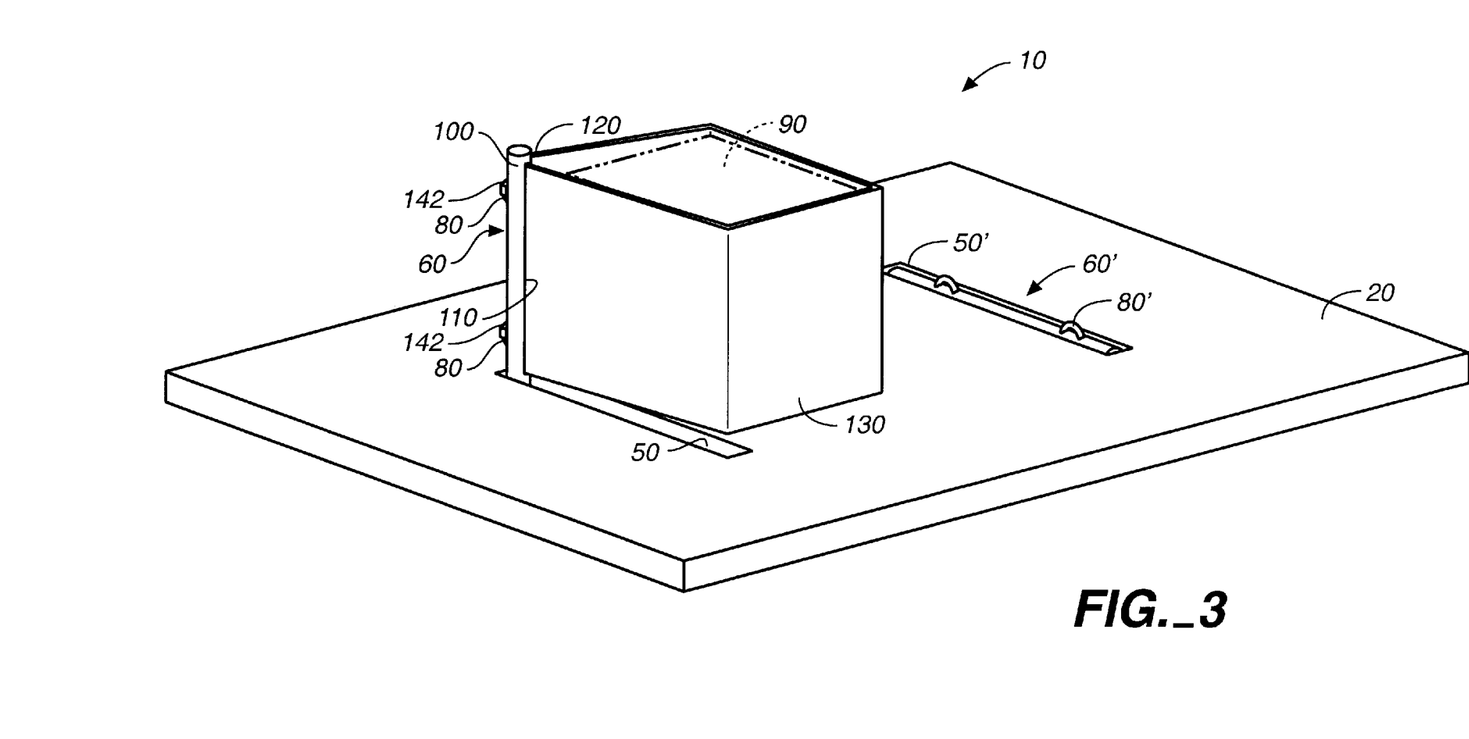
FIG. 3 is a top perspective view corresponding to FIG. 2A, showing a flexible barrier member secured in a deployed position around a piece of cargo.
Figure 4:
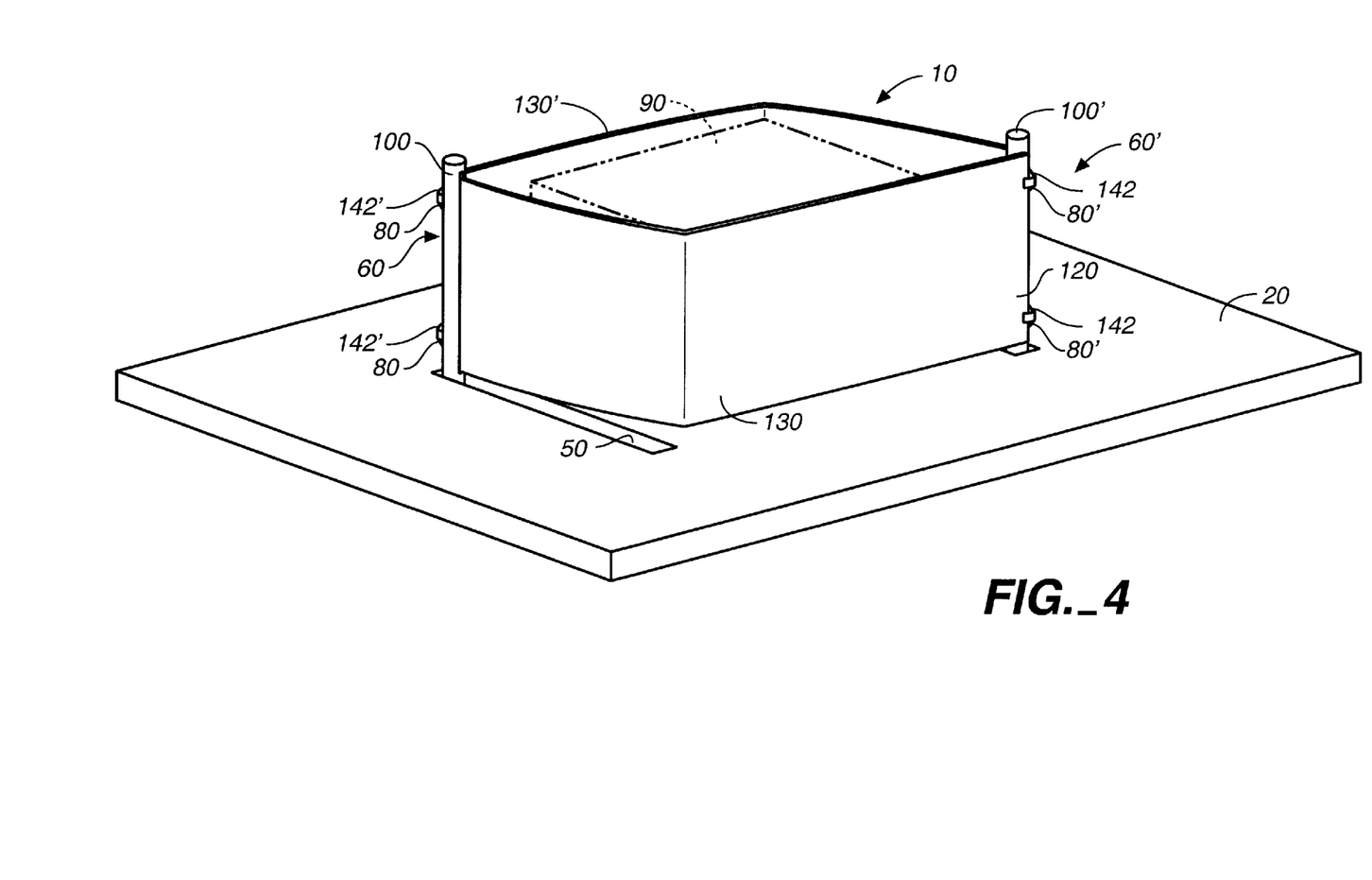
FIG. 4 is a top perspective view corresponding to FIG. 2A showing cooperation between two barrier devices to restrain cargo.

In order to maximize the available volume of cargo space 25 and reduce the number of components used in the cargo restraining assembly of the present invention, barrier device 60 is selectively stowable (as shown in FIG. 1) and deployable, preferably without detachment from bed liner structure 20 (as shown in FIGS. 3 and 4). Thus, a barrier member 130 of barrier device 60 is movable relative to securement structure or bed liner 20 between a stowed position closely proximate a space-defining wall of cargo space 20 (FIG. 1) to a deployed position extending outwardly of the wall and into cargo space 25 (FIGS. 3 and 4). In the illustrated embodiment, bed liner structure 20 is closely proximate bottom wall or bed 30 defining cargo space 25, and barrier member 130 of barrier device 60 is movable between a stowed position close to bed 30 and a deployed position at which it extends around, or at least partially encircles, a piece of cargo 90 in cargo space 25 to limit the movement of cargo in the cargo space.

In a broad aspect of the present invention, barrier device 60 may be provided as a barrier or partition formed by a relatively rigid member, such as the gate members shown in our copending patent application entitled "Cargo Restraining Gate Assembly and Method," or as a flexible sheet, web, strip or similar perforate or imperforate flexible barrier member 130. In the illustrated embodiment of FIGS. 1–4, an imperforate flexible sheet 130 is used as the barrier member, but mesh sheets and strip-like, ribbon-like or woven webbing flexible barrier members also could be employed.

One substantial advantage of employing a flexible sheet-like barrier member 130 is that it can be easily stowed in a rolled up condition proximate a cargo space defining wall without occupying much of the cargo space. Moreover, flexible barrier members can be easily and rapidly deployed to restrain cargo, in a manner described in detail below.

Similar advantages, however, can be realized using a rigid partition or barrier member. Thus, a rigid panel can be pivoted along on edge to a rod or mast which, in turn, is pivoted to bed liner 20 at an end of the mast transversely to the mast. The bed liner can have a recess dimensioned to receive the panel, and the panel can be deployed by pivoting the mast up out of the bed liner and swinging or pivoting the panel around the mast to the desired deployed position. One or more such panels could be mounted to the bed liner and cooperatively coupled together in the deployed positions to restrain cargo movement. Alternatively, the panel could be coupled to a cargo space defining wall for the same purpose.

Whether the barrier member is rigid or flexible, it is stowable in assembly 10 of the present invention in a manner allowing virtually all of cargo space 25 to be used, for example, to transport personnel or full loads of cargo. If the entire volume of cargo space 25 is to be filled, there is little need to restrain cargo movement interiorly of the cargo space defining walls, since these walls are the ultimate restraining structure. Stowing of barrier devices 60 compactly within space 25 allows maximum use of the cargo space.

Referring again to FIG. 1, bed liner structure 20 preferably is sized and shaped to fit on bed 30 of a transport vehicle, such as SUV 40. The bed liner may simply sit atop bed 30, or may be more permanently secured to vehicle 40 using screws or adhesives or other attachment devices. According to the illustrated embodiment, at least one barrier storage cavity 50 (best seen in FIG. 2B) is formed in bed liner 20. Since a plurality of barrier devices 60, 60' are shown in the embodiment of FIGS. 1–4, bed liner structure 20 has two barrier storage cavities 50, 50', each sized to retain, when in a horizontal or stowed position, a barrier device 60, 60'.

Figure 2A:
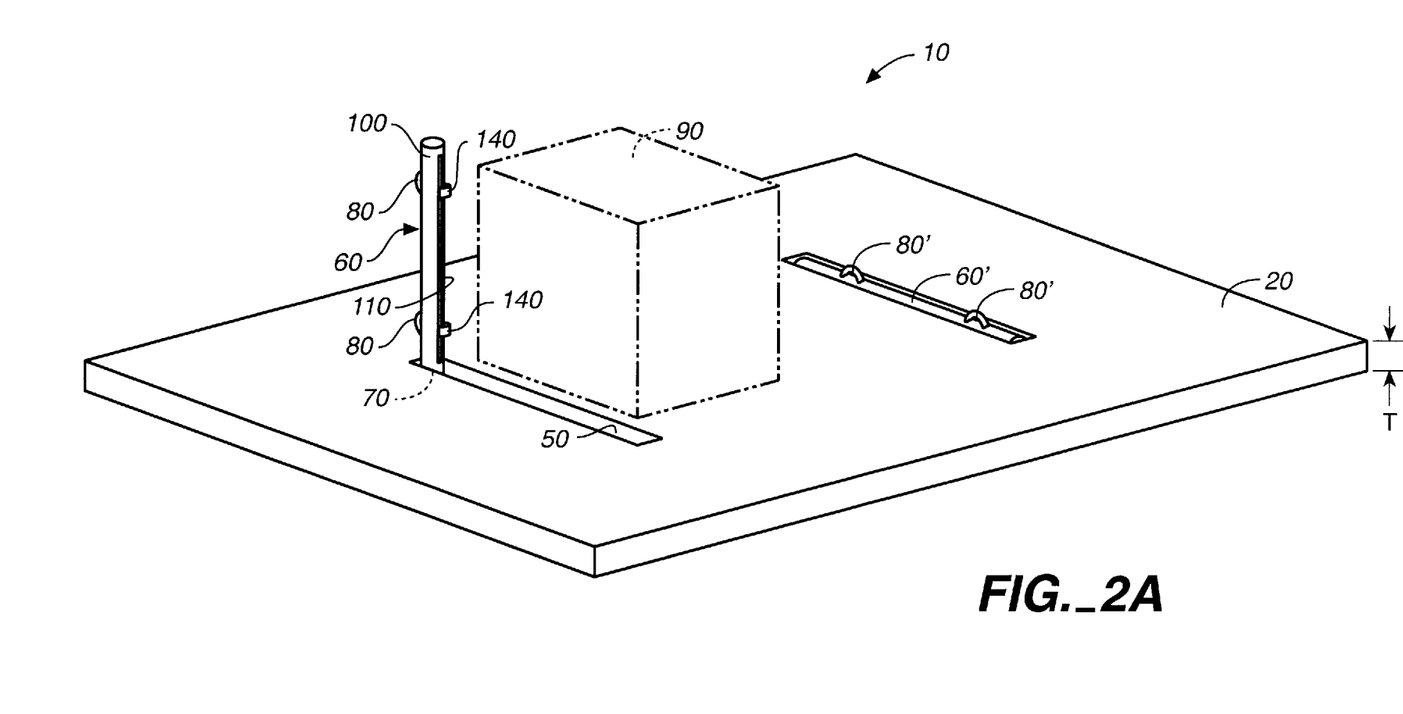
FIG. 2A is a top perspective view of the cargo restraining barrier assembly of FIG. 1 removed from the transport vehicle and showing one of the barrier devices in a stowed position and the other of the barrier devices in an upright deployed position next to cargo to be restrained shown in phantom.
Figure 2B:
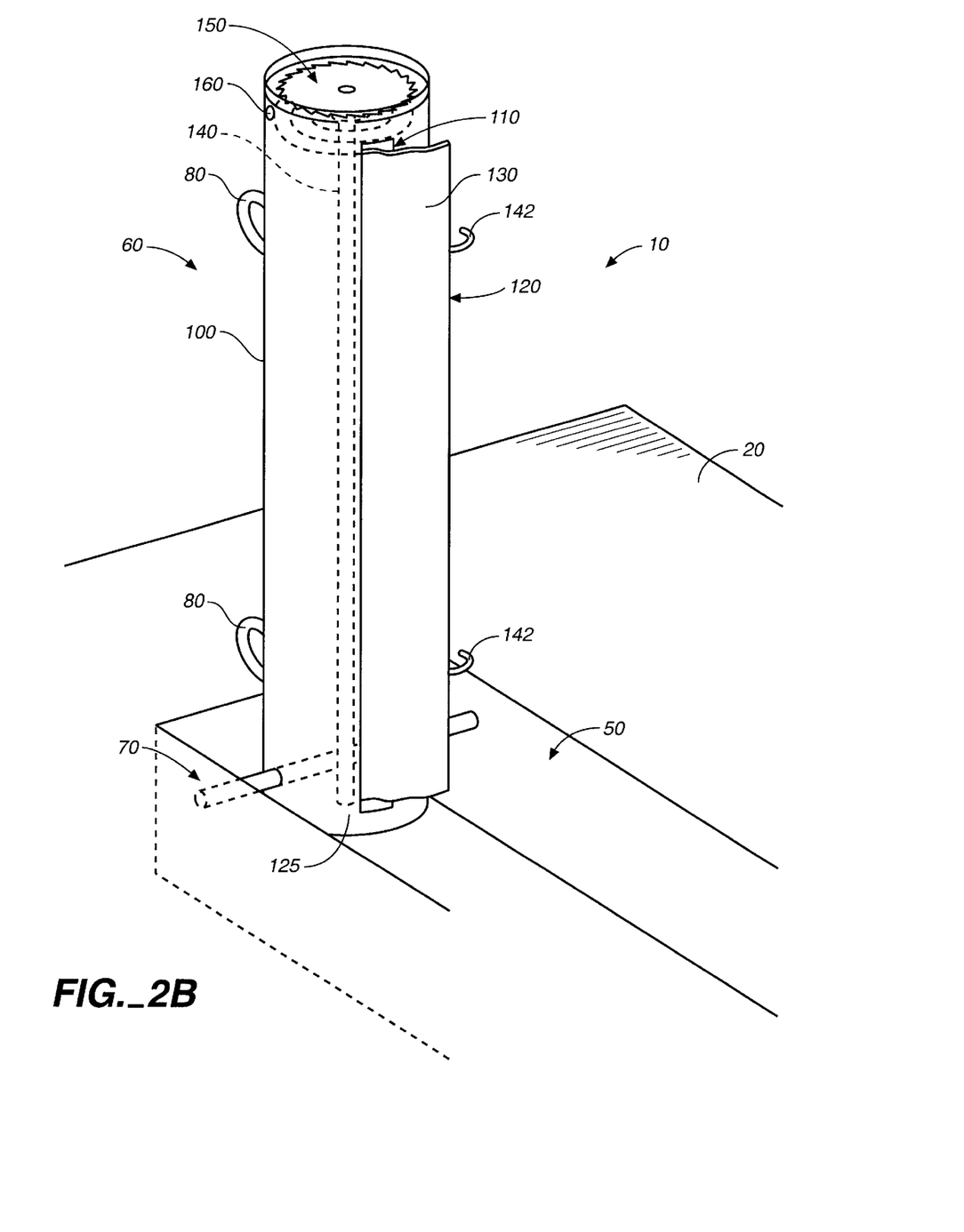
FIG. 2B is an enlarged, fragmentary, top perspective view of one of the cargo restraining barrier devices of FIG. 2A.

In order to reduce the problem of manipulation of many components, barrier devices 60, 60' are preferably coupled to the bed liner, for example, by a pivot assembly or mechanism 70 (FIG. 2B). When stored within barrier storage cavity 50, 50', the upper surface of each barrier device 60, 60' preferably is substantially flush with the upper surface of bed liner 20. When a flexible barrier 130 is employed, barrier device 60 may include a movable barrier support structure, such as, an axle or spindle 140 on which flexible barrier 130 can be rolled up. The barrier support structure also can include an axle mounting assembly or barrier housing 100 in which axle 140 is carried and can rotate.

In the most preferred embodiment, an elongated barrier housing 100 is provided which substantially encloses barrier member 130, but has a slot or opening 110 through which barrier member 130 extends. Accessible from opening 110 of housing 100 is a distal side edge 120 of flexible barrier member 130, that is wound or rolled up when stored about axle or spindle 140. The proximal or opposite edge of flexible barrier member 130 is attached to spindle 140. An end 125 of barrier housing 100 is coupled by pivotal mounting assembly 70 to bed liner structure 20. The pivotal mounting assembly 70 can be considered as a portion of bed liner structure 20, as such expression is used herein, and in the preferred embodiment it pivots the barrier support structure to bed liner structure 20 about an axis transverse to the rotational axis of spindle 140.

Referring now to FIG. 2A, one barrier device 60 has been pivoted upright about its pivot 70. A detent (not shown) associated with pivot 70 may be used to frictionally and releasably retain barrier device 60 in a moved position extending into cargo space 25. For a barrier storage cavity located in a portion of bed liner 20 which is generally horizontally oriented, the barrier support housing 100 is in an upright position which is oriented substantially 90° relative to the plan of liner 20. Pivots 70 which include releasable detent devices are known in the art and further description herein is unnecessary. Suffice it to say that pivot mechanism 70 permits a user of the present invention to pivot barrier support housing 100 of barrier device 60 between substantially horizontally oriented, stowed position within barrier storage cavity or chamber 50, and an upright, substantially vertical position, as shown in FIG. 2A.

Housing 100 and barrier devices 60 can be moved to other orientations within the scope of the present invention. For example, bed liner structures also often include side walls. Thus, barrier storage cavity 50 could be provided as a vertically oriented cavity in a side wall of bed liner 20, and a barrier device 60 pivoted from a near vertical stowed position to a near horizontal deployed position. Similarly, a horizontally oriented barrier storage cavity in a vertically oriented bed liner side wall would allow a barrier device to be pivoted in a horizontal plane to a deployed position. Moreover, various angles other than 90° could be accommodated depending upon the bed liner and cargo space geometry.

As shown in FIG. 2A, a piece of cargo 90 is placed on bed liner 20 adjacent upright barrier device 60. A second barrier device 60' is shown in FIG. 2A still in its stowed position, where it may remain unless also needed to secure or restrain cargo 90 (as is illustrated in FIG. 4 and described in more detail below).

Flexible barrier member 130 preferably is made from a flexible, thin yet strong material, for example nylon, although other materials may be used, including metals, meshes, fabrics, strapping, and other flexible members which can be rolled up for stowing. A transverse dimension (if housing 100 is not circular in cross-section) or a diameter of about 5 cm for housing 100 can accommodate a length of nylon sheeting 130 of about 3 m, or more. The length of housing 100 typically will exceed 25 cm. Of course, different diameters and lengths may be used for housing 100. Preferably, the thickness, T, of bed liner structure 20 is at least as large as the diameter of housing 100 of barrier devices 60, 60'.

Edge 120 of barrier member 130 preferably includes at least one coupling device such as an anchor hook 142. It is preferred that hook 142 be disposed along a vertical portion of edge 120 enabling the hook to be matingly and releasably secured to a complementary coupling eye or loop 80 on the exterior surface of housing 100. As will be seen, loop 80 may in fact be located on another housing 100' comprising device 10. Of course, the roles of hook and loop could be interchanged, e.g., hook 142 could instead be a loop, and loop 80 could instead be a hook.

A preferably a ratchet mechanism 150 is disposed within housing 100 and enables such portion of flexible barrier member 130 as has been pulled through slot 110 to be tautly biased, e.g., to be urged or biased back toward housing 100 and away from the couplers to which hooks 142 are releasably attached. Ratchet assembly 150 locks barrier 130 against being pulled further out of housing 100 so that the biasing spring does not have to withstand the full force of cargo shifting. A release mechanism 160 is provided for the ratchet assembly so that, when pressed or otherwise activated by a user of the present invention, the biasing spring rewinds (or permits rewinding) of flexible barrier sheet 130 about spindle 140. If desired, a crank or wind-lever may also be included to more rapidly rewind barrier member 130 about spindle or axle 140. Releasable biased ratchet assemblies are well known in the art and thus no further description is given here.

In FIG. 3, a sufficient length of flexible barrier 130 has been pulled through slot 110 in housing 100 to surround the perimeter of a piece of cargo 90. Hooks 142 on distal edge 120 of barrier sheet 130 are coupled to loops 80 on housing 100 and ratchet 150 has retracted any excess length of the barrier member and latched the same against further outward deployment. Cargo piece 90, therefore, is surrounded by a taut flexible barrier member 130 to housing 100, which in turn is coupled to the bed liner. In this position, cargo 90 is restrained against uncontrolled lateral movement as the transport vehicle in which assembly 10 is mounted may move. In the worst case, cargo 90 might attempt to pivot about member 60 if excess motion of the host vehicle is experienced, but completely unrestrained movement of the cargo is prevented by the cargo restraining assembly of the present invention. Moreover, flexible barrier 130 also could be releasably attached to the bed liner intermediate ends 120 and housing 100 to prevent swinging around housing 100.

In some instances, it may be desirable or necessary to secure cargo with more barrier members 130, 130' than can be stored within a single barrier storage cavity 50. For example, the cargo may be so fragile or so heavy that it is desirable to provide restraint using more than one barrier device 60, 60'. FIG. 4 shows cargo 90 restrained by a first flexible barrier member 130 from a first barrier device 60, and by a second flexible barrier member 130' from a second upright barrier device 60'. Hooks 142 on edge 120 of first barrier 130 matingly engage with loops 80' on second barrier housing 100' of the second barrier device. Similarly, hooks 142' are coupled to eyes or loops 80 on first barrier housing 100. Thus, first flexible barrier member 130 and second flexible barrier member 130' cooperate to limit movement of cargo piece 90.

Figure 5:
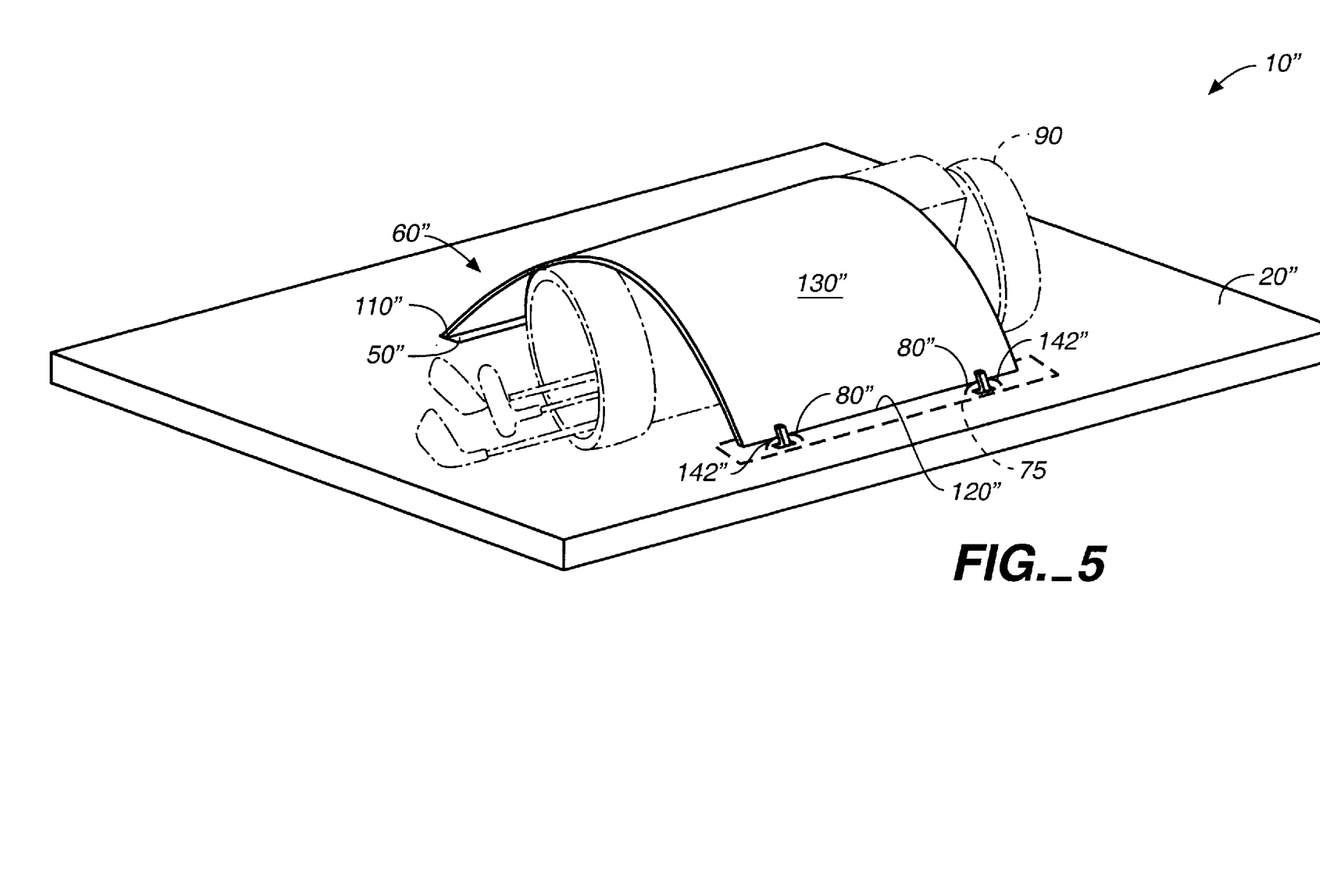
FIG. 5 is a top perspective view of an alternative embodiment of the cargo restraining barrier assembly of the present invention showing a horizontally oriented barrier device used to limit cargo movement.

In the embodiment of FIGS. 1-4, at least one barrier device 60 was mounted to a barrier support structure, such as housing 100, which was moved from the barrier storage cavity to a position extending into cargo space before the barrier member itself was distended or deployed. In FIG. 5, an alternative embodiment of the stowable cargo restraining assembly, generally designated 10", is shown that restrains cargo 90 by holding it against the support surface provided by bed liner 20". In this configuration, it is not necessary to deploy a housing or support structure out of the bed liner and into the cargo space in order to operate barrier device 60". As such, barrier device 60" need not pivot and may be permanently attached to bed liner 20" in a horizontal orientation within storage cavity 50" such that slot 110" is always accessible to the user. Couplers such as eyes or loops 80" for attaching barrier member 130" to bed liner 20" can be provided at various distances from barrier device 60" to enable securement of cargo of differing sizes, and more than one such barrier device can be provided in the bed liner for cooperative retention of cargo.

Cargo 90 to be restrained is placed on bed liner 20" near barrier device 60", and movable flexible barrier member 130" is unrolled from its axle to distend the flexible member and cover at least a portion of cargo piece 90. Hooks 142" are attached to the distal edge 120" of sheet 130" and will matingly couple with loops 80". Loops 80" may be permanently affixed to a portion of bed liner 20", or may be provided on the vehicle, or may be provided on a second horizontally disposed barrier device (not shown) positioned, for example, at broken line location 75.

The stowable cargo restraining assembly of the present invention may be implemented using ordinary materials. Bed liner structure 20 may be fabricated from metal, heavy duty plastic, or any other material that can withstand the elements and the wear and tear associated with loading and unloading cargo. Barrier housing 100 may be fabricated from metal, plastic, nylon, or other material that can withstand the elements and provide adequate protection to flexible barrier member 130, stored within.

Having described the apparatus of the present invention, the present method can be briefly set forth.

A method of restraining cargo 90 in a cargo space 25 of a transport vehicle 40 is provided. Broadly, the method includes the steps of mounting a bed liner structure 20, 20' in cargo space 25 with the bed liner structure having barrier device 60, 60', 60" stowed therein, preferably in a barrier storage cavity 50, 50', 50". The method includes the further step of, after the mounting step, selectively moving the barrier device 60, 60', 60" between a stowed position and a deployed position limiting movement of cargo positioned in cargo space 25. Barrier device 60, 60', 60" preferably includes a movable flexible barrier 130, 130', 130" which, when in the deployed position, is thereafter releasably secured to limit cargo movement.

In a preferred method, the moving step is accomplished by moving a barrier support structure, such as axle 140 and housing 100 from the stowed position into cargo space 25 and then unrolling and rolling flexible gate member 130, 130' from spindle or axle 140.

The present method also can be accomplished by mounting a bed liner 20, 20' having a plurality of barrier devices 60, 60' therein in cargo space 25 and thereafter moving the plurality of barrier devices 60, 60' to a plurality of deployed positions for cooperation between the barriers to limit movement of cargo 90.

Another broad aspect of the present method includes the steps of mounting a flexible barrier member 130, 130', 130" in a rolled up condition proximate a cargo space 25, unrolling the flexible barrier member to a deployed position, and securing the flexible barrier in the deployed position to limit movement of cargo in cargo space 25.

The apparatus and method of the present invention eliminate the handling and storage problems presented by prior art cargo restraining assemblies in which a plurality of plug-in pieces are used to limit cargo movement. It will be understood that modifications and variations may be made to the disclosed apparatus and method without departing from the subject and spirit of the invention, as defined by the following claims.

What is claimed is:

1. A stowable cargo restraining barrier assembly for limiting movement of cargo positioned in a storage space of a transport vehicle, said barrier assembly comprising:

a securement structure including a rotatable axle, said securement structure being formed for mounting on a floor defining said storage space of said transport vehicle with said axle substantially horizontally oriented; and a cargo restraining flexible barrier mounted to said axle, said flexible barrier being coupled to said axle and formed for movement relative to said securement structure, while cargo is positioned on said floor, between a substantially horizontal stowed position and a deployed position extending outwardly of said securement structure and into said storage space to a position limiting lateral movement of cargo positioned on said floor of said storage space.

2. The stowable cargo restraining assembly as defined in claim 1, and
said securement structure includes a mounting assembly formed for mounting of said cargo restraining assembly to said transport vehicle; and
a movable barrier support structure coupled to said mounting assembly, and said flexible barrier being coupled to said movable barrier support structure and said barrier support structure being movable between a position proximate said floor to a position extending from said floor into said storage space while cargo is supported on said floor for deployment of said flexible barrier from said barrier support structure to said deployed position.

3. The stowable cargo restraining assembly as defined in claim 1 wherein,
said flexible barrier is a flexible sheet-like member.

4. The stowable cargo restraining assembly as defined in claim 1 wherein,
said flexible barrier is formed for releasable securement in said deployed position to said securement structure.

5. The stowable cargo restraining assembly as defined in claim 4 wherein,
said flexible barrier is formed for movement from said deployed position to a rolled up condition in said stowed position; and
a biasing mechanism coupled to said flexible barrier for biasing said flexible barrier for movement toward said rolled up condition.

* * * * *